March 6, 1945.  J. C. MORISON  2,371,063
ARTICLE HANDLING APPARATUS
Filed Aug. 6, 1942  8 Sheets-Sheet 1

FIG. 1

INVENTOR
J. C. MORISON
BY Harry R. Duft
ATTORNEY

March 6, 1945.   J. C. MORISON   2,371,063
ARTICLE HANDLING APPARATUS
Filed Aug. 6, 1942   8 Sheets-Sheet 2

FIG. 2

INVENTOR
J. C. MORISON
BY Harry L. Dwight
ATTORNEY

March 6, 1945. J. C. MORISON 2,371,063
ARTICLE HANDLING APPARATUS
Filed Aug. 6, 1942 8 Sheets-Sheet 4

INVENTOR
J. C. MORISON
BY
ATTORNEY

Patented Mar. 6, 1945

2,371,063

UNITED STATES PATENT OFFICE 2,371,063

ARTICLE HANDLING APPARATUS

James C. Morison, Berwyn, Ill., assignor to Western Electric Company, Incorporated, New York, N. Y., a corporation of New York Application August 6, 1942, Serial No. 453,838

18 Claims. (Cl. 78—96)

This invention relates to article handling apparatus and more particularly to a mechanism for handling blanks during the forging thereof and the transference thereof between the various steps of a forging apparatus.

The forging of relatively small parts has, in the past, been quite expensive due to the fact that it is exceedingly difficult to devise automatic machinery for handling the part during the forging operations and the parts are usually handled manually during the entire forging operation. This difficulty is primarily due to the difficulty in providing means for holding the article which will withstand the shock of the forging elements against the part and still properly position the part in the forging positions. In other words, the difficulty has been in simulating manual handling of the parts since an operator may hold a part relatively loosely in a pair of tongs and permit the part to move when engaged by the forging dies.

An object of the present invention is the provision of an automatically operated apparatus to transfer a blank from one step to another of a set of cooperating forging punches and dies.

In accordance with one embodiment of the present invention, a rod having a blank gripping chuck at the end thereof is provided for holding the relatively cool end of a blank which is to be forged into a drive hook for use on telephone or telegraph poles. This blank is, in its original form, a straight rod of metal which is to be bent to form a hook at one end thereof and to form a small nub or head at the juncture of the hook portion with the straight portion, whereby the hook may be driven into a pole. In order to thus form the blank, five forging or forming operations are necessary and, accordingly, the blank must be transferred to five different positions with respect to the gripping dies of the forging machine. In addition to being transferred to the five different positions in the gripping dies, the blank must be advanced and retracted, as well as oscillated, in order to, in the first forging step, bend the farthest extending end of the blank to form the hook on it; in the second step engage the blank with dies of substantially the same construction as used in the first step to insure the proper formation of the hook portion and to form the nub or head; and in the third step clamp the blank between the gripping jaws to remove the forging flash from it and then again advance the blank so that the end of it projects beyond the gripping dies to complete the forging of the nub or head at the end of the shank and then in the final step again grip the blank between the gripping dies to remove as much as possible of the flash formed on the blank.

The chuck carrying rod which is used to support the blank during its forging is provided with a spring chuck for gripping the blank and has projections formed on it whereby, in the operation of the forging machine, the gripping die slide will actuate suitable mechanism for vertically transferring the rod with the blank supported by it in five distinct steps and in addition oscillate the blank and shift it longitudinally. The mechanism for transferring the blank vertically comprises a series of holding frames and pawls interconnected by suitable actuating mechanism to the movable gripping die, thereby to step the blank to a different forging position each time the gripping dies are closed. As the rod which supports the blank is transferred vertically to the various positions, three separate oscillatory movements must be imparted to the blank, one oscillatory movement being imparted to it as it steps from the second to the third position of the gripping dies and as it steps from the third to the fourth and fourth to the fifth positions of the gripping dies. To accomplish this oscillatory movement, fixed abutments are positioned in the path of a projection extending at right angles to and formed integrally with the blank supporting rod so that as the blank is stepped to the various positions, it will be turned at suitable intervals to suit the succeeding operation to be performed on it. Since the blank must not only be elevated and oscillated in its transference to the various steps in the forging apparatus, but must also be reciprocated to disengage it from the forging dies and retract it to position where the gripping dies can compress the forging flash formed on it, the rod is provided with a disc which travels between shiftable guides and these guides are actuated indirectly by the movement of the gripping jaws to reciprocate the rod carrying the blank as the rod is transferred vertically and oscillated.

A better understanding of the invention will be had by reference to the following detailed description when considered in conjunction with the accompanying drawings, wherein.

Figure 1:
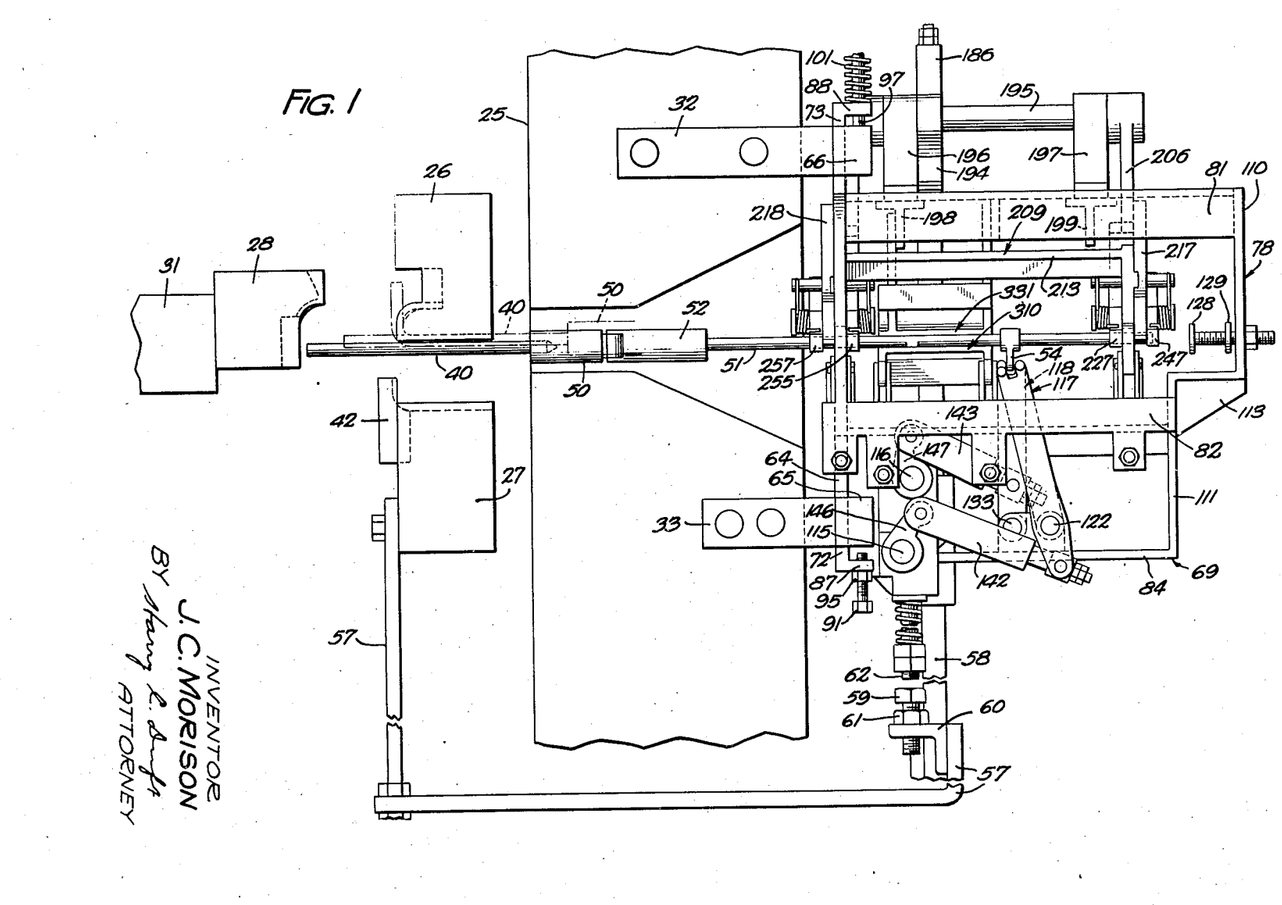
Fig. 1 is a plan view of the apparatus embodying the present invention shown with the forging mechanism illustrated only diagrammatically and shown in the position which the transferring apparatus assumes when the gripping dies of the forge are opened.
Figure 2:
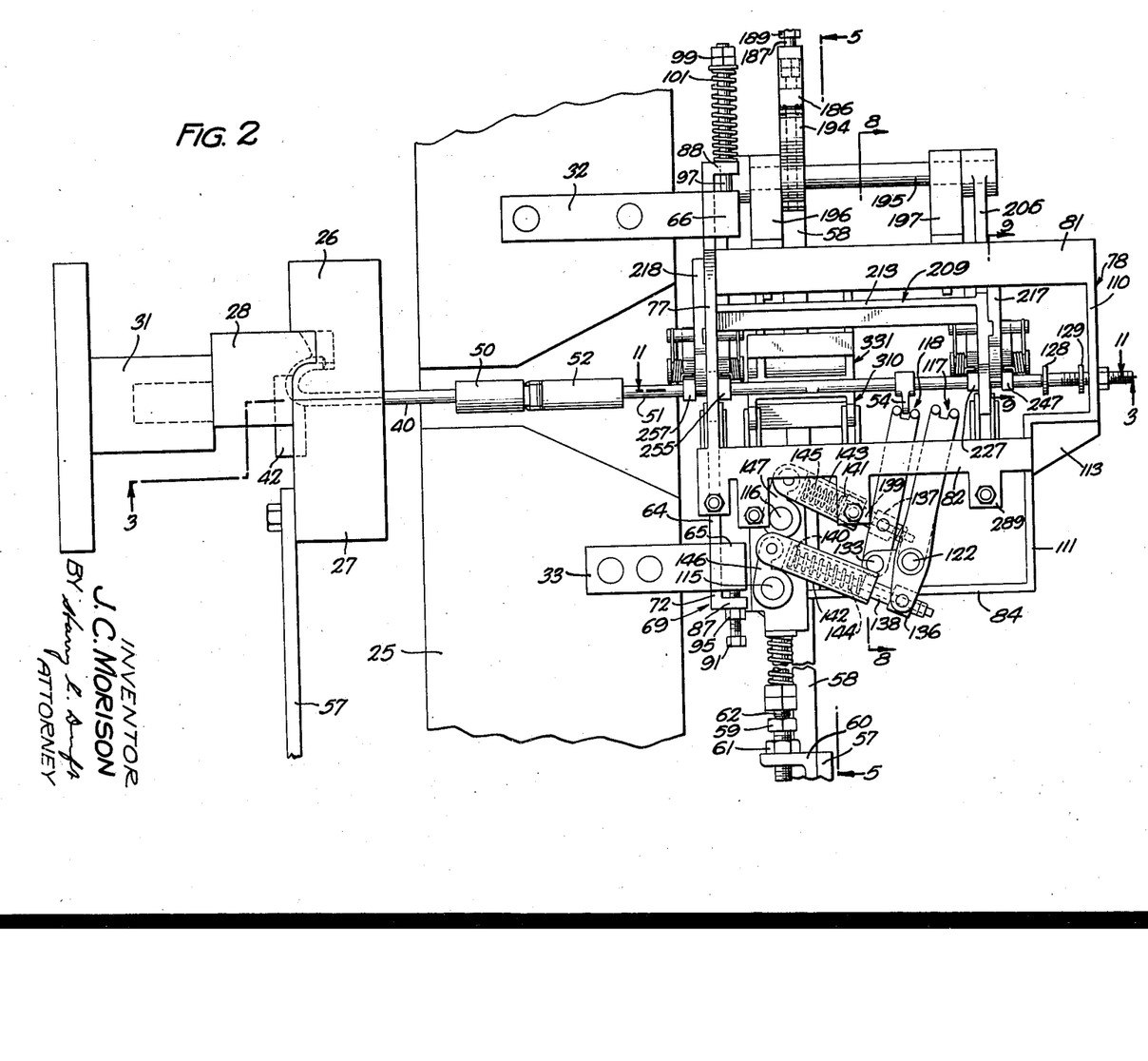
Fig. 2 is a view similar to Fig. 1 except that it shows the apparatus in the position it occupies when the gripping jaws are closed and the forging die is in its operating position.
Figures 3, 4:
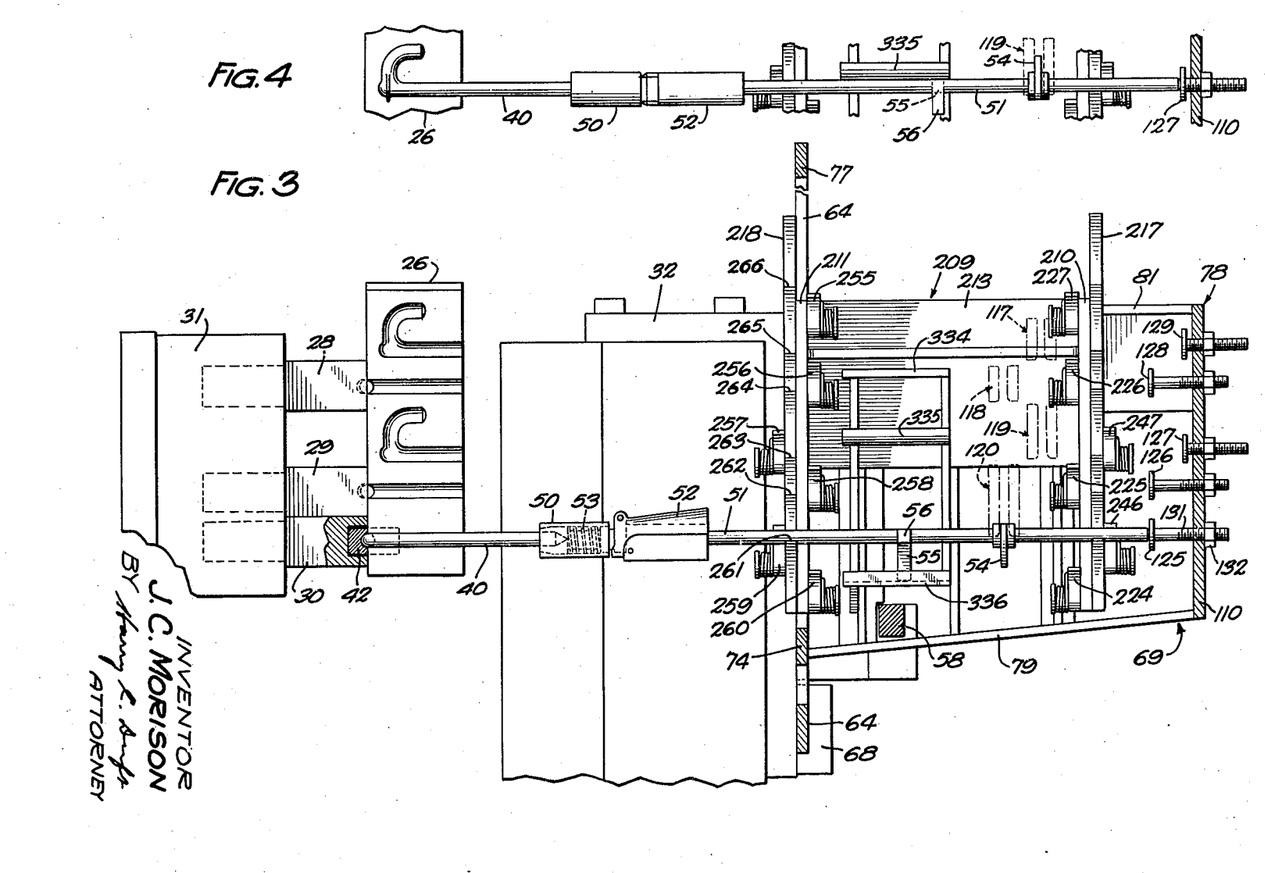
Fig. 3 is a longitudinal vertical sectional view taken along the line 3—3 of Fig. 2 in the direction of the arrows and showing the blank holding rod in its lowermost position.
Fig. 4 is a fragmentary view taken also along the line 3—3, but showing the blank supporting rod in one of its upper positions where it has been oscillated through 90° from the position shown in Fig. 3 and retracted to its extreme right hand position. This is the position which the rod assumes in the third and fifth operative positions of the forge.

In the drawings, there is shown, particularly in Figs. 1 and 2, a typical forging apparatus comprised of a main framework 25 having associated therewith fixed and movable gripping dies 26 and 27, and forging punches 28, 29 and 30 (Fig. 3). The forging dies are suitably mounted on a punch slide 31. The movable gripping die 27 and punch slide 31 may be actuated by any suitable mechanism (not shown) connected to operate five times in succession for each time the operation thereof is initiated. This may be accomplished by any suitable control means and, as is usual in forging apparatus of this general type, the gripping die 27 is first moved from the position shown in Fig. 1 to the position shown in Fig. 2 to cooperate with the fixed gripping jaw 26 for gripping a blank between the gripping jaws and thereafter the punch slide 31 is moved from the position shown in Fig. 1 to the position shown in Fig. 2 to effect the desired forging operation. In this forging operation, it will be apparent that the fixed gripping jaw 26 serves as a die to cooperate with the forging dies 28, 29 and 30 in effecting the forming of the part to the desired shape. The main framework 25 constitutes a base on which the transfer mechanism comprising the present invention may be mounted, suitable brackets 32 and 33 being provided for supporting the transfer mechanism on the front face, that is, the right hand side (Figs. 1 and 2) of the framework 25.

In the apparatus as described briefly hereinbefore, it was pointed out that the specific embodiment of the invention illustrated herein is designed to form a drive hook. This drive hook, designated 35, is illustrated in Fig. 18 and comprises a shank portion 36, which has a point 37 and is provided with a nub or head 38 at its opposite end. The end of the drive hook 35, which is to extend from a pole, is curved, as shown at 39. In the various steps of the forging operation, the blank 40 is transformed from the form shown in Fig. 15 to the configuration illustrated in Fig. 18. In the first step of the forging operation, the movable gripping die 27, in moving to position to clamp the blank, bends a portion of the blank at right angles to the main body thereof, as shown in dotted lines (Fig. 15) at 41, the gripping jaws 27 being provided with a forming die 42 (Figs. 1, 2, and 3) which engages the extending end of the blank 40 and bends it over just prior to the engagement of the bent-over portion, as indicated at 41 (Fig. 15) by forging punch 30 shown most clearly in Fig. 4. The forging punch 30 partially surrounds the forming die 42 and continues the forming of the extending end of the blank 40 to shape it to the configuration shown in Fig. 16. In the next step of the forging operation, the head or bent-over portion of the blank 40 will be engaged by the punch 29, which serves to cooperate with the fixed gripping jaw 26 and the movable gripping jaw 27 to form the nub or head 38 on the blank 40. In forming the head 38 on the blank 40, a forging flash 43 (Fig. 17) will be formed on the blank at the parting line of the dies formed by forging die 29 and gripping jaws 26 and 27. In the next step of the forging operation, the gripping dies clamp the blank 40 to squeeze the forging flash 43 back into the body of the blank, after which the punch 28 will again strike the upper end of the blank 40 to reform the nub or head 38 and in the final step of the forging apparatus, the gripping jaws 26 and 27 will remove any flash which has been raised on the part in the fourth forging position.

The apparatus thus far described, with the exception of the main brackets 32 and 33, which hold the transfer mechanism, comprises a conventional forging mechanism in which blanks 40 may be forged while being held in position to be forged by tongs manipulated by an operator. In the present invention, however, the handling of the blank throughout the forging operation is completely mechanical and the blank is, after being heated, gripped by a chuck 50 (Fig. 3) mounted on the end of a blank holder 51. The chuck 50 may be of any suitable construction, manipulatable by means of a manually operable hand lever 52 for opening it and permitting it to close under pressure of a spring 53 on the pointed end of a blank 40. The blank holder 51 is provided adjacent its right end or handle portion with a disc 54, which is suitably secured to the shank of the holder 51. Intermediate the disc 54 and the chuck 50, the blank holder 51 is provided with a pair of extending arms 55 and 56, as shown most clearly in Fig. 6. The arms 55 and 56 extend outwardly from the holder 51 and are disposed at right angles one to the other. These arms serve to oscillate the rod or blank holder during its movement through the transfer mechanism, whereas the disc 54 serves to position the blank holder 51 axially.

Figures 5, 6:
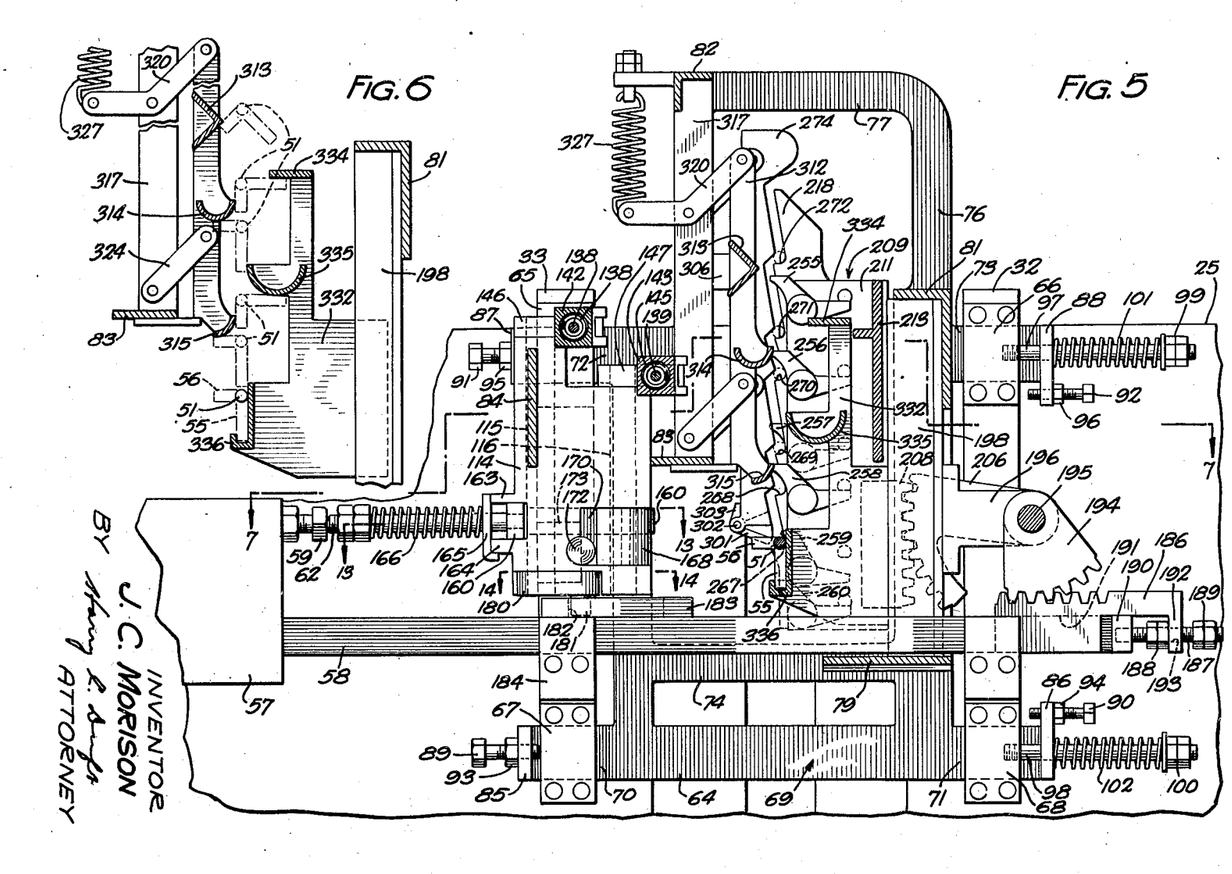
Fig. 5 is a transverse vertical sectional view taken substantially along the line 5—5 of Fig. 2 in the direction of the arrows looking toward the forging apparatus and showing details of the mechanism for elevating the blank holding rod to its various positions and for oscillating the rod during its transference from one position to the other.
Fig. 6 is a fragmentary view similar to Fig. 5, but showing more clearly the means for oscillating the rod as it is shifted vertically, eliminating the showing of the various parts of the apparatus not pertinent to the means for oscillating the rod.

As pointed out hereinbefore, the brackets 32 and 33 are fixed to the main framework or base 25. The only other connection which the transfer mechanism has with the forging apparatus, as most clearly shown in Fig. 1, comprises an actuator framework 57, which is attached to the movable gripping jaw 27 and extends around the main framework or base 25 for actuating the various mechanisms of the transfer apparatus. The actuator framework 57 extends around to the front of the forge and has two actuators fixed to it. One of the actuators fixed to the actuating framework 57 is a slide 58 while the other actuator comprises an adjustable abutment 59 in the form of a machine screw threaded into an angle member 60 forming part of the actuator framework. The abutment 59 may be adjusted with respect to the angle member 60 and locked in position by a lock nut 61 to properly position it for actuating a threaded rod 62 after a predetermined amount of movement of the framework 57. The slide member 58 is fixed to the framework 57 and moves with it at all times. As shown in Fig. 5, the slide 58 is in the extreme right hand position, whereas, as shown in Fig. 1, gripping jaw 27 being in its open position, the slide member 58 is in the opposite position from that shown in Fig. 5.

Figure 7:
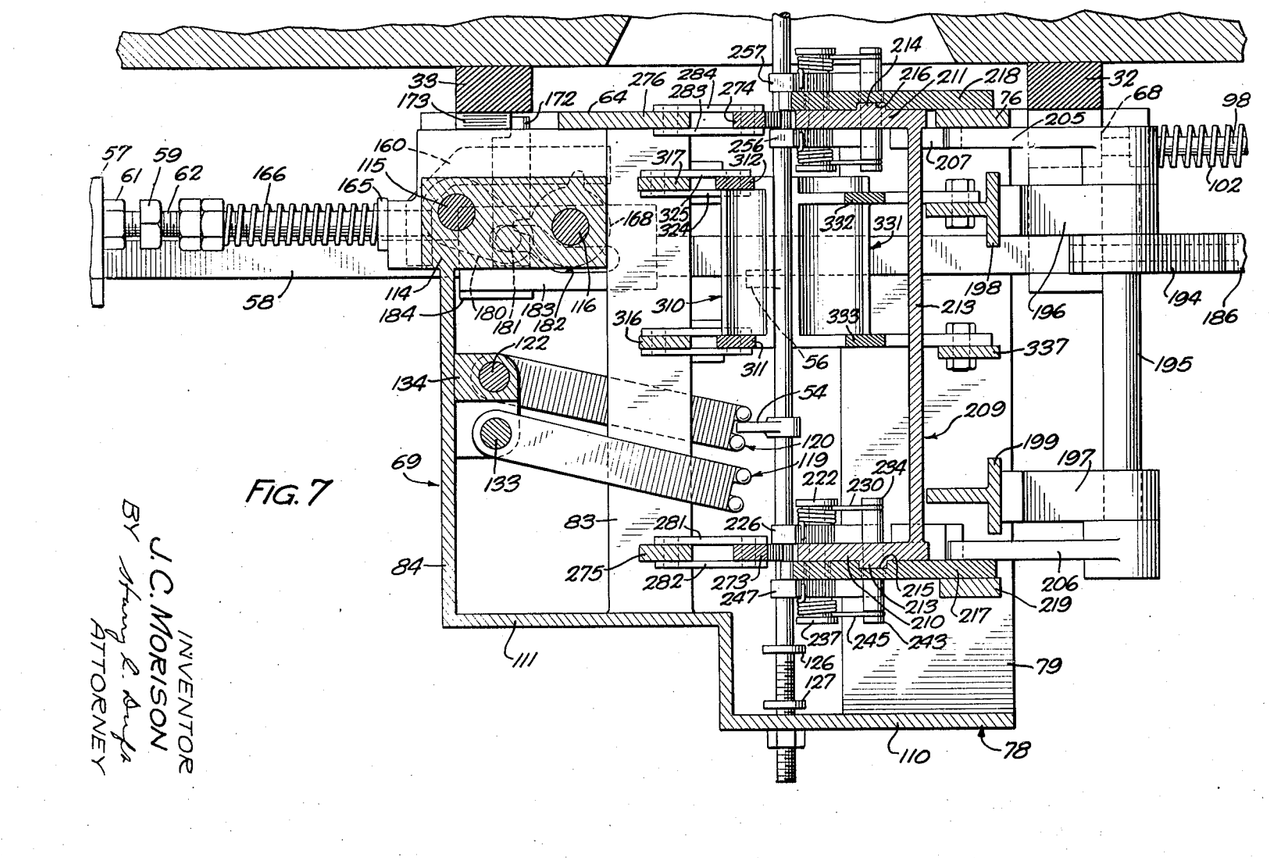
Fig. 7 is a plan section taken substantially along the line 7—7 of Fig. 5 in the direction of the arrows and showing details of the mechanism for imparting reciprocation to the rod as well as some of the details of the means for handling the rod during its transference vertically. This figure also shows some details of the mechanism for moving the rod horizontally to disengage the blank shank from the dies.

As most clearly shown in Figs. 1, 2 and 5, the brackets 32 and 33 have attached to them guide blocks 65, 66, 67 and 68, which serve to guide a main frame member 69 for limited travel across the face of the base 25. This frame member 69, as most clearly shown in Figs. 5 and 7, is a box-like structure composed of a main rear plate 64 of irregular configuration having, at its lower end, extending guide portions 70 and 71 (Fig. 5) and being provided adjacent its mid portion with similar guide portions 72 and 73, which fit between the guide blocks 65 to 68, inclusive, and the brackets 32 and 33 to slidably support the main frame member 69. The rear plate 64, which, as pointed out, is of irregular configuration, has an intermediate connecting web 74 (Figs. 3 and 5) extending between side portions 75 and 76 thereof. At the upper portion of the main frame member, the side portions 75 and 76 are interconnected by a top portion 77. A front plate 78 is positioned forwardly of the rear plate 64, being supported from the rear plate 64 by means of a bottom diagonally disposed plate 79 (Figs. 3, 5 and 7), a right hand angle member 81 (Figs. 1, 2, 3 and 5), a left-hand angle member 82 (Figs. 1, 2, 5 and 11), a tie plate 83 and a side plate 84. All of the members thus described as being connected to the rear plate 64, are welded one to another to form the main frame member 69.

Guide portions 70, 71 72 and 73 of the main frame member 69 are bent forwardly (Figs. 1, 2 and 5) to provide members 85, 86, 87 and 88, respectively, which serve to receive machine screws 89, 90, 91 and 92, respectively, which may be locked in an adjusted position on the members 85, 86, 87 and 88 by lock nuts 93, 94, 95 and 96 to serve as abutments or stops for engagement with the guide blocks 67, 68, 65 and 66, respectively. The guide blocks 66 and 68 have posts 97 and 98 threaded through them which extend freely through suitable apertures in the members 88 and 86, respectively, and are threaded at their outer end to receive lock nut assemblies 99 and 100, respectively (Figs. 2 and 5). The posts 97 and 98 are surrounded by compression springs 101 and 102, respectively, which are compressed between the lock nut assemblies 99 and 100 and the members 88 and 86, respectively, thus to normally urge the main frame member 69 to the position shown in Fig. 1, which is the opposite to that shown in the other figures. In this manner, the entire framework supported by the main frame member 69 is urged to the position shown in Fig. 1 but may be moved to the position shown in the other figures. Movement of the main frame member 69 to the right (Fig. 5) is effected by the abutment 59 near the end of travel of the actuator framework 57 to the right and movement of the main frame member 69 to the left is effected by the springs 101 and 102.

It should be noted that the front plate 78 is formed of two members 110 and 111 interconnected by a plate 112 and a bracing member 113. Interposed between the side plate 84 and the rear plate 64 is a bearing block 114, which may be welded to plates 64 and 84 and which supports a pair of shafts 115 and 116 (Figs. 5, 7, 13 and 14). The shafts 115 and 116 in the bearing block 114 serve to shift guide assemblies 117, 118, 119 and 120, which, in turn, position the blank holder 51 axially during the travel of the blank holder through the apparatus. In Fig. 1, the guide assemblies are shown with their guiding portions in alignment, whereas in the rest of the figures, the guide assemblies have been shifted to the position which they assume when the gripping dies of the forging machine are closed, where one of the guide assemblies will be urging the blank holder 51 toward the front of the apparatus. Each of the guide assemblies is of similar construction, different only in the size of the various parts and, therefore, only one of the guide assemblies will be described in detail, that is, the guide assembly 120.

Figures 11, 12:
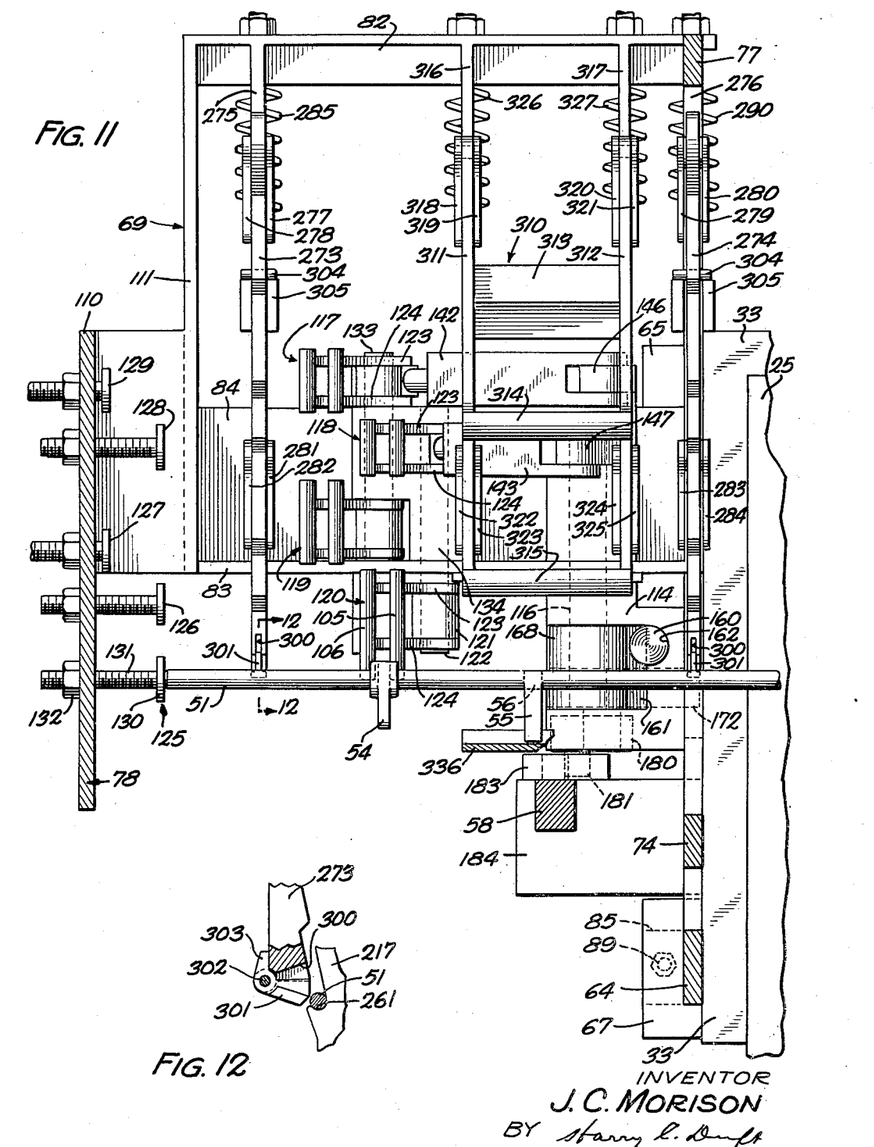
Fig. 11 is a vertical sectional view taken substantially along the line 11—11 of Fig. 2 in the direction of the arrows showing details of the means for reciprocating the blank holding rod and the abutments which control the oscillation of the rod.
Fig. 12 is a fragmentary detail sectional view taken substantially along the line 12—12 of Fig. 11 in the direction of the arrows showing mechanism which is involved in holding the rod in position as it is originally placed in the apparatus.

The guide assembly 120 comprises a sleeve portion 121 suitably keyed to a shaft 122 (Figs. 7 and 11). The sleeve 121 has extending from it a pair of arms 123 and 124. At the end of the arms 123 and 124, away from the sleeve 121, the arms are joined together by a pair of guide rods 105 and 106, within which the disc 54 will ride in the travel of the blank holder 51 upwardly through the apparatus. In all of the positions of the apparatus except that illustrated in Fig. 1, the blank holder 51 has positioned a blank 40 in the gripping jaws 26 and 27, and just prior to being gripped by the jaws, has been shifted by the guide assemblies 117 to 120, inclusive, into engagement with adjustable abutments 125, 126, 127, 128 or 129. In Fig. 11, the blank holder 51 is shown engaging the adjustable abutment 125, which comprises, as do the other adjustable abutments, a head portion 130, a threaded shank 131 threaded in the member 110 of front plate 78 and locked in position thereon by a lock nut 132.

Figures 8, 9, 10:
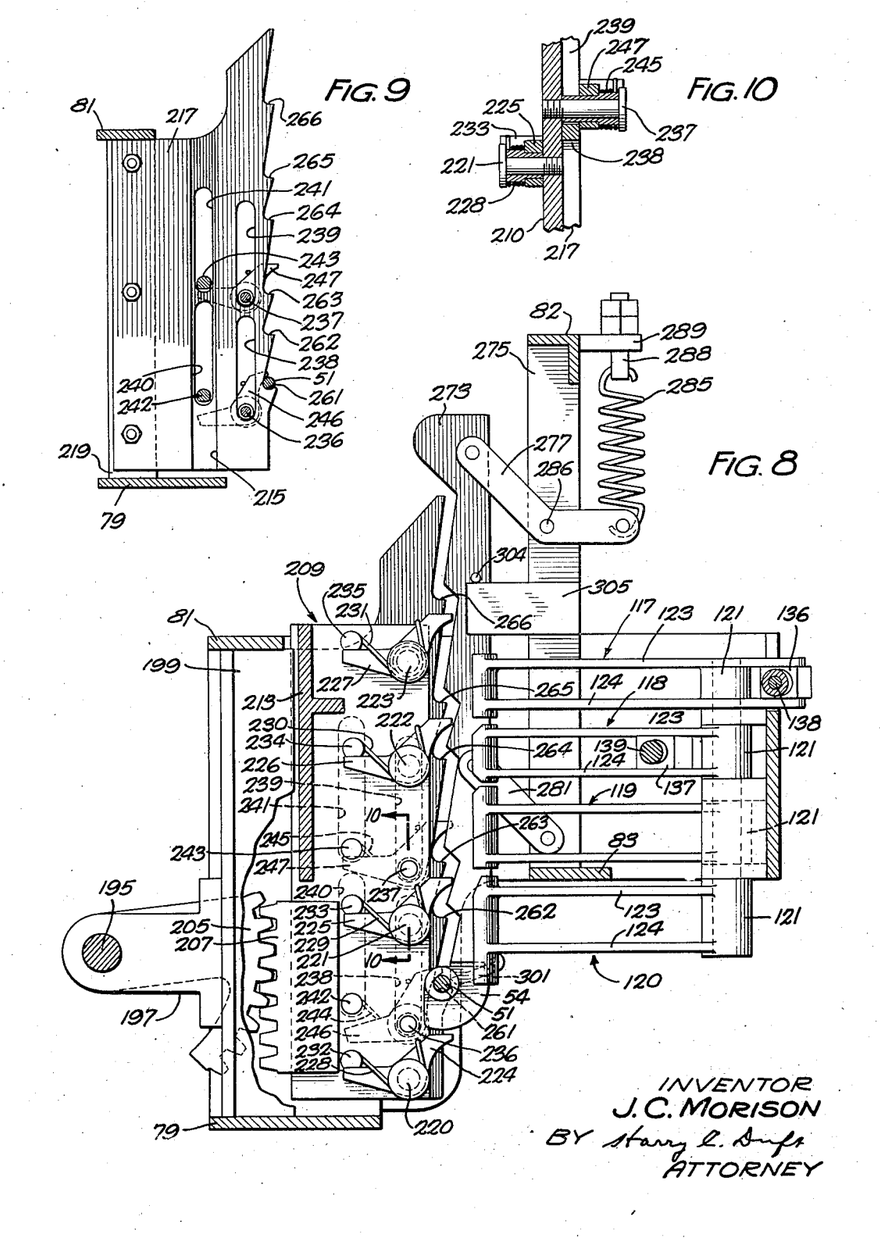
Fig. 8 is a fragmentary vertical sectional view taken substantially along the line 8—8 of Fig. 2 in the direction of the arrows and looking toward the front or loading portion of the apparatus and away from the forging machine to illustrate details of the mechanism for imparting vertical movement to the blank supporting rod and for imparting reciprocation thereto.
Fig. 9 is a fragmentary detail sectional view of a part of the mechanism which handles the rod in its transference vertically.
Fig. 10 is a detail sectional view taken substantially along the line 10—10 of Fig. 8 in the direction of the arrows showing the details of construction of the pawls which are utilized in transferring the rod vertically.

The guide assemblies 120 and 118 are fixed to the shaft 122 and guide assemblies 117 and 119 are fixed to a similar shaft 133. The shafts 122 and 133 are journalled for free rotation in an irregularly shaped bearing block 134, fixed to the side plate 84. Intermediate arms 123 and 124 of the guide assemblies 117 and 118, as seen most clearly in Fig. 8, are pivoted a pair of blocks 136 and 137, respectively. It should be noted that the blocks 136 and 137 are positioned at opposite sides of the sleeves 121 of their respective assemblies. The blocks 136 and 137 have rods 138 and 139 fixed to them, which carry heads 140 and 141 (Fig. 2), respectively, within spring supporting cylinders 142 and 143. It should be noted that spring 144 in cylinder 142 surrounds the shank of the rod 138, whereas the spring 145 in the spring cylinder 143 is compressed between the end of the cylinder and the head 141 of the rod 139. The spring cylinder 142 is pivotally connected to a lever 146 (Fig. 2) fixed to shaft 115 and spring cylinder 143 is pivotally connected to a lever 147 fixed to shaft 116, as best seen in Figs. 2 and 5. Thus, the rotation of shafts 115 and 116 will, through the spring cylinders 142 and 143 and their associated parts, oscillate the guide assemblies 117, 118, 119 and 120 about the axis of the shafts 122 and 133 to shift the guide assemblies 117 to 120, inclusive, from the positions shown in all of the figures, except Fig. 1, to the position in which they are shown in Fig. 1. This operation of shifting from the position shown, for example, in Fig. 2, to the position shown in Fig. 1, occurs just as soon as the abutment 59 moves away from the threaded rod 62, as will become apparent as the description progresses. Similarly, the movement of the guide assemblies 117 to 120, inclusive, from the position shown in Fig. 1 to the position shown in the remainder of the figures, will occur just prior to the time that the gripping dies 26 and 27 grip the blank held in blank holder 51 at the end of the travel of the gripping die 27.

From the foregoing, it is believed to be apparent that the guide assemblies 117 to 120, inclusive, have their guide rods 105 and 106 in alignment at all times except for the short interval when the gripping jaw 27 is quite close to or engages the blank holder 51 between it and the fixed gripping die 26.

Figures 13, 15:
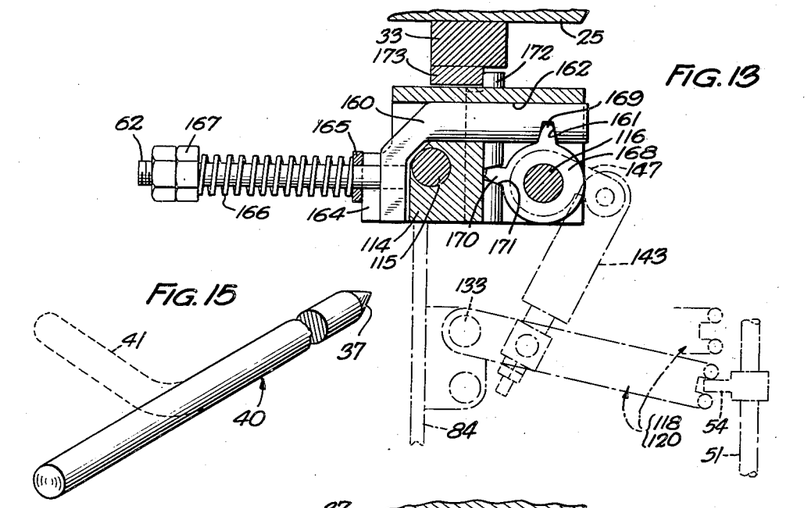
Figs. 13 and 14 are fragmentary detail sectional views taken substantially along the lines 13—13 and 14—14 of Fig. 5 in the direction of the arrows and showing details of the actuating mechanism for the rod reciprocating devices.
Fig. 15 is a perspective view of a blank before it is formed in the apparatus and showing in dotted lines the first forming operation performed on the blank by the gripping jaws.
Figures 14, 16, 17, 18:
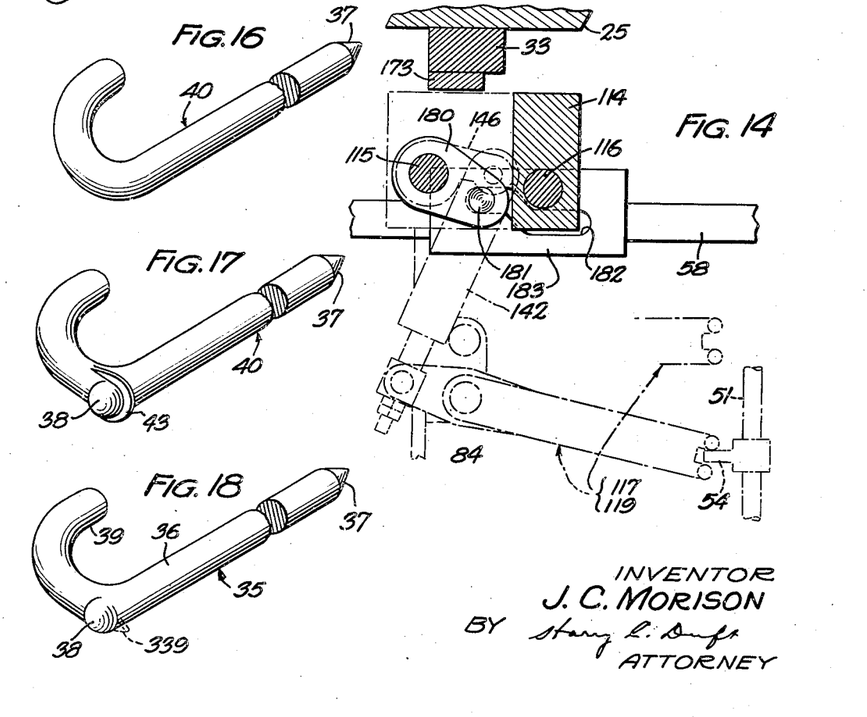
Fig. 16 is a perspective view of the blank after the hook has been formed on it in the first step of the forging punch.
Fig. 17 is a view in perspective of a blank illustrating the condition thereof after the blank has been removed from the second section or step of the foregoing apparatus.
Fig. 18 is a view in perspective of the article ultimately formed from the blank.

Rotative movement is imparted to the shaft 116 by the threaded rod 62, which is threaded into a substantially L-shaped member 160, as most clearly shown in Fig. 13. The L-shaped member 160 has a single rack tooth or indentation 161 formed in it and the member 160 slides in an aperture 162 formed in the bearing block 114. The bearing block 114 is provided with a pair of guide projections 163 and 164 (Fig. 5) for guiding the end of the member 160 into which the rod 62 is threaded and a lock plate 165 is suitably secured to the projections 163 and 164 to limit the extent of movement of the member 160. Surrounding the threaded rod 62 is a compression spring 166, which is compressed between a lock nut assembly 167 on rod 62 and the lock plate 165, thereby tending to move the threaded rod 62 to the left (Fig. 13). The shaft 116 has secured to it a gear segment 168 having two teeth 169 and 170. The tooth 169 enters into the indentation or rack 161, whereas the tooth 170 extends into a notch 171 in a lock rack 172. The lock rack 172 is also slidable in the bearing block 114 and has an extending end which, in the position shown in Fig. 13, engages the latch member 173 fixed to the bracket 33. From the foregoing, it is believed to be apparent that as the abutment 59 moves away from the end of the threaded member 62, the spring 166 will move the threaded member 62 and member 160 to the left (Fig. 13) to impart rotation in a counter-clockwise direction to the shaft 116, thereby to move the guide assemblies 118 and 120 from the position shown in most of the figures back to the position shown in Fig. 1.

Simultaneously with the movement of the guide assemblies to the position shown in Fig. 1, the shaft 116 will move the lock rack 172 out of engagement with the latch member 173 and as soon as the lock rack 172 disengages the latch member 173, springs 101 and 103, which are under compression, will shift the entire assembly supported by the rear plate 64 and comprising the main frame member 69 and attached parts, to the left (Figs. 5 and 7). As the springs 101 and 102 shift the main framework lever 69 to the left, the framework will continue to move until the machine screws 90 and 92 abut the guide blocks 68 and 66, respectively. In moving to the left-hand position from the position shown in Figs. 2 to 14, inclusive, the framework member 69 will carry the bearing block 114 with it and move the shaft 115, which is journalled in the bearing block 114, to the left. At its lower end, the shaft 115 has fixed to it a lever 180 (Figs. 5, 7 and 14). The lever 180 carries a downwardly extending pin 181, which extends into a cam slot 182 formed in a block 183, which is attached to the slide 58. As soon as the slide 58 is actuated by the actuator framework 57, the actuator framework will move with the gripping jaw 27 and will move the block 183 to the left (Figs. 7 and 14). As the block 183 moves to the left, the cam slot 182 therein will acting on the pin 181, rotate the shaft 115 clockwise to move the guide assemblies 117 and 119 into alignment with the guide assemblies 118 and 120, as shown in Fig. 1, so that a blank holder 51 may be transferred vertically into position between the guide rods 105 and 106, upon further operation of the apparatus.

As the slide 58 moves to the left during the opening of the gripping dies, it will, after it has moved a short distance, impart movement to a rack 186 (Fig. 5). The rack 186 is mounted upon the slide 58 for limited movement thereon, being adjustably attached to the rack through a threaded member 187 which has two lock nut assemblies 188 and 189 threaded on it and which is fixed in an end portion 190 of the slide 58. The rack 186 is provided with a slot 191 formed in its undersurface in which the slide 58 may move to an extent determined by the position of the lock nut assemblies 188 and 189 without actuating the rack 186, the downwardly extending portion 192 of the rack being provided with an aperture 193 through which the threaded member 187 passes freely. As the slide 58 begins its movement to the left from the position shown in Fig. 5, the lock nut assembly 188 will move out of engagement with the portion 192 of the rack 186 and the rack will not be actuated until lock nut assembly 189 engages it. During this portion of the cycle when the slide 58 is moving and the rack 186 is not being moved, the guide assemblies 118 and 120 will be shifted to the position shown in Fig. 1.

After the lock nut assembly 189 has engaged the downwardly extending portion of rack 186, continued movement of the slide 58 to the left will carry the rack 186 to the left and rock a gear segment 194 in mesh with the rack 186 in a clockwise direction. The gear segment 194 is fixed to a shaft 195 journalled in a pair of brackets 196 and 197 (Fig. 2), which are, in turn, mounted on two T-beams 198 and 199 (Figs. 1, 5 and 8). The T-beams 198 and 199 extend between the bottom diagonally disposed plate 79 and the right-hand angle member 81. Also mounted on the shaft 195 are a pair of gear segments 205 and 206, which mesh with racks 207 and 208 mounted upon a pawl slide, designated generally by the number 209. The pawl slide 209, as best illustrated in Fig. 7, comprises front and rear pawl supporting plates 210 and 211, respectively, interconnected by a connecting plate 213, thus forming a unitary structure adapted for actuation by the gear segments 205 and 206. The front pawl supporting plate 210 is provided with a projection 213 and the rear pawl supporting plate 211 is provided with a projection 214. These projections 213 and 214 ride in guide grooves 215 and 216, respectively, formed in pawl slide guiding plates 217 and 218. The pawl slide guiding plate 217 is fixed to a vertically extending bar 219, which is fixed to the bottom diagonally disposed plate 79 and the horizontal portion of the right hand angle member 81, whereas the pawl slide guiding plate 218 is fixed to the rear plate 64.

Extending rearwardly from the front pawl supporting plate, as seen in Fig. 8, are four pawl supporting pins 220, 221, 222 and 223, which pivotally support pawls 224, 225, 226 and 227, respectively. The pawls 224 to 227, respectively, are normally urged to rotate in a clockwise direction (Fig. 8) by springs 228, 229, 230 and 231, which are coiled around the pins 220 to 223, respectively, bent over a portion of the pawl and fixed to spring pins 232, 233, 234 and 235, respectively. In addition to the pawls 224 to 227, inclusive, the front pawl supporting plate 210 also supports a pair of pawl supporting pins 236 and 237, which extend toward the front of the machine through slots 238 and 239 in the pawl slide guiding plate 217. Two additional slots 240 and 241 are provided in the pawl slide guiding plate 217, through which pins 242 and 243 extend for engaging springs 244 and 245, respectively, which urge pawls 246 and 247, mounted on pins 236 and 237, to rock in a clockwise direction (Fig. 8). The six pawls described hereinbefore are adapted to engage the underside of the blank holder 51 to transfer it step by step through the apparatus in a vertical path and they cooperate with similarly disposed pawls 255 to 260, inclusive, similarly mounted on the rear pawl supporting plate 211 and having springs (not shown) for rocking them in a counter-clockwise direction (Fig. 5). As may be seen by reference to Fig. 3, the pawls 255, 256, 258 and 260 are disposed on the front surface of the pawl supporting plate 211, whereas the pawls 257 and 259 are positioned in the rear surface of the plate 211 and extend beyond the rear plate 64. The pawl slide guiding plates 217 and 218 have a series of teeth or notches 261 to 266, inclusive, cut in them, as best seen in Figs. 5, 8 and 9, the notches 261 to 266 being formed in the plate 217, whereas notches 267 to 272 are formed in the plate 218. These notches are adapted to receive and support the blank holder 51 at its various vertical positions during the transference of it through the transfer apparatus.

Positioned in the same plane as the front pawl supporting plate 210 and rear pawl supporting plate 211, are a pair of retaining plates 273 and 274, having teeth cut in the surface thereof toward the pawls which cooperate with the notches 261 to 272 to hold the blank holder 51 in the notches to which it is transferred by the pawls. The retaining plates 273 and 274 are supported indirectly by support columns 275 and 276, which extend between the tie plate 83 and the left-hand angle member 82, the column 276 being positioned in the plane of and forming a part of the rear plate 64. Specifically, retaining plates 273 and 274 are mounted on a pantograph arrangement comprising bell cranks 277, 278, 279 and 280 (Figs. 8 and 11) and levers 281, 282, 283 and 284. The bell cranks 277 and 278 are pivoted on the support column 275, the bell cranks 279 and 280 are pivoted on the column 276, the levers 281 and 282 are pivoted on the column 275 and the levers 283 and 284 are pivoted on the column 276. Both of the bell-crank levers 277 and 278 are attached to a spring 285, which urges the bell cranks to rock about their pivot 286 in a counter-clockwise direction (Fig. 8), and thus urge the retaining plate 273 toward the blank holder 51 on the pawl slide guiding plate 217. The spring 285 is connected to the right end (Fig. 8) of the bell crank 277 and to a stud 288 mounted on a projection 289, suitably attached to the left-hand angle member 82. As seen in Fig. 11, a spring 290, similar to the spring 285, urges the retaining plate 274 toward a blank holder 51 engaged in the notches on the plate 218.

The bottom of the retaining plates 273 and 274 are of exactly the same construction and only the bottom of the plate 273 need be described. As shown in Fig. 11, plate 273 has a slot 300 formed in it, in which there is positioned a latch 301 (Fig. 12). The latch 301 is pivoted in the slot 300 by means of pins 302 fixed in the opposed portions of the retaining plate 273. The latch 301 is substantially L-shaped in configuration and has a vertically extending portion 303, which normally engages the left-hand surface (Fig. 12) of the retaining plate 273 above the slot 300. The horizontally extending portion of the latch 301 is appreciably heavier than the vertically extending portion and, therefore, the latch will rock to the position shown in Fig. 12. However, a slight pressure on the horizontally extending portion of the latch will cause the latch to rock counter-clockwise, thereby to permit a blank holder 51 to be placed in position on the notch 261 on plate 217 and the corresponding notch on plate 218, which notches are positioned to hold the blank holder so that a blank held by it will be in alignment with the first forging position of the forge. The retaining plates 273 and 274 are thus urged downwardly to the position shown and are restrained against movement downwardly beyond that position by pins 304 in the plates 273 and 274 engaging stop plates 305 and 306 on the columns 275 and 276, respectively.

Also resiliently mounted for cooperation with the blank holder 51 and specifically adapted to engage the arm 56 on the blank holder is a cam supporting frame, designated generally by the numeral 310. The cam supporting frame 310 comprises a pair of upright members 311 and 312 having extending between them and fixed to them an angle member 313 (Figs. 5 and 11), a semicircular member 314 and a segmental cam plate 315. The cam supporting frame is linked to a pair of braces 316 and 317, which extend between the left-hand angle member 82 and the tie plate 83. A pantograph arrangement which supports the cam supporting frame 310 comprises bell cranks 318, 319, 320 and 321 and links 322, 323, 324 and 325 pivotally connected to the upright members 311 and 312 and pivoted on braces 316 and 317. Bell cranks 318, 319, 320 and 321 are normally urged to rock clockwise (Fig. 5) by springs 326 and 327, whereby the cam supporting frame 310 will be urged to a position where the cam surfaces, comprising the angle member 313, semi-circular plate 314 and segmental cam 315, will be in the path of the arm 56 on the blank holder 51 as the blank holder is transferred vertically.

Cooperating with the cam supporting plate 310, is a second cam supporting frame 331, composed of upright members 332 and 333 interconnected by a flat top cam plate 334, semi-circular cam plate 335 and a U-shaped guide 336. The upright members 332 and 333, at their lower ends, extend over to the right (Fig. 7) and are fixed to the T-beam 198 and a cooperating support bar 337, which extends between the right hand angle member 81 and the bottom diagonally disposed plate 79 to rigidly support the cam supporting frame 331 in a position where the guide 336 will receive the arm 55 of the blank holder 51, as shown most clearly in Fig. 6, and where the semi-circular cam and flat cam 335 and 334 will be positioned in the path of the arm 55 of the blank holder during the travel of the blank holder upwardly through the apparatus.

A better understanding of the apparatus may be had by reference to the following brief description of the mode of operation thereof in handling a part, specifically a drive hook, during the forging operations thereon. As pointed out hereinbefore, the forging apparatus is provided with a suitable control circuit, which, upon being initiated in operation, will cause the forging machine to be operated five times in automatic succession and then will interrupt the operation of the forge until such operation is reinitiated manually. Any suitable circuit may be provided for so controlling the operation of the forging machine and in so doing, a blank 40, originally of the shape shown in full lines in Fig. 15, will be completely formed by the forging punches and gripping dies of the forging machine without further manual intervention. In order to initiate the operation of the apparatus, a blank 40, the end of which is to be operated on, having been heated to the desired temperature either while held in the chuck 50 of the blank holder 51 or heated before being gripped by the blank holder, may be inserted into the apparatus manually. In order to insert the blank into the apparatus, the operator may place the arm 56 of the blank holder 51 in the U-shaped guide 336 with the disc 54 of the blank holder between guide rods 105 and 106 of the guide assembly 120. In placing the blank holder in this position, the latch 301 will be momentarily displaced while the blank holder's shank is set into notch 261 on pawl slide guiding plate 217 and the aligned notch 267 on plate 218. As soon as the blank holder is properly positioned, the latch 301 will fall to the position shown in Fig. 12 and will tend to hold the blank holder 51 in the lowermost position.

After the blank holder 51, having a blank 40 in its chuck 50, has been set into the machine, as just described, the control circuit for the forging machine may be initiated into operation in any suitable manner and as the gripping die 27 of the forge starts to travel from the position shown in Fig. 1 to the position shown in Fig. 2, it will carry with it the actuator framework 57. The actuator framework 57, in travelling from the position which it occupies when the gripping dies 27 and 26 are the farthest distance apart, to the position shown in all of the figures except Fig. 1 of the drawings, will rock the gear segment 194 to the position shown through the operation of the slide 58 and rack 186 mounted thereon. While this rocking movement of the gear segment 194 is taking place, the springs 101 and 102 will hold the machine screws 90 and 92 against the guide blocks 62 and 68 and thereby prevent the main framework 69 from shifting from the position shown in Fig. 1 to the position shown in the remainder of the figures relating to this portion of the apparatus. As pointed out in the general description of the apparatus, the guide assemblies 117 to 120, inclusive, will have their guide rods 105 and 106 in vertical alignment, as shown in Fig. 1, just before the gripping die 27 engages the blank 40. As the gear segment 194 rocks, it will rock the shaft 195, to which it is fixed, and shaft 195 will, in turn, rock the gear segments 206 down to the position shown, for example, in Fig. 5. In rocking to the position shown in Figs. 5 and 8, the gear segments 205 and 206 will drive the pawl slide 209 downwardly due to the engagement of the teeth of the segments with the racks 207 and 208 fixed to the pawl slide. As the pawl slide 209 moves downwardly the first time, the pawls 224 and 260 will pass over the shank of the blank holder 51 to the position shown in the drawings and after the pawls have moved to the position shown, the abutment 59 will engage the threaded rod 62 to push the framework 69 across the face of the apparatus against the action of the springs 101 and 102, which tend to hold the frame 69 in its lefthand position. As the movable gripping die 27 continues to move toward engagement with the blank 40 held by the blank holder 51, the blank will be pushed into engagement with the fixed gripping die 26 as the framework 69 shifts to the right and as soon as the blank 40 has engaged with the fixed gripping jaw 26, the movement of the framework 69 will be stopped due to the engagement of the machine screw 89 with guide blocks 69 and the engagement of the machine screw 91 with the guide block 65. The gripping jaw 27, however, will continue to move and in so moving, will continue to push on the threaded rod 62. By the time that the framework 69 has shifted to the position shown, for example, in Fig. 5, the block rack 172 will be in such a position that it may be moved over to the position shown in Fig. 13 by the continued movement of the rod 62 and the consequent movement of the L-shaped member 160 to the right. Thus, the framework 69 will be locked in its right hand position and the shaft 116 will be rotated due to the engagement of the teeth 169 in the indentation or tooth 169 in the L-shaped member 160. As the shaft 116 rotates in a clockwise direction, it will move the lever 147 clockwise and will resiliently urge the arms 123 and 124 of guide assembly 118 to rock clockwise about the axis of the shaft 122. Since the lever 147 is fixed to the shaft 122, the shaft 122 will be rotated and will carry the guide assembly 120 in a clockwise direction. Since the disc 54 is at this time positioned between the guide rods 105 and 106 of the guide assembly 120, the blank holder will be moved forward of the machine to bring its end into engagement with the head 130 of the adjustable abutment 125. Thus, at the time that the gripping die 27 engages and grips the blank 40 between it and the gripping die 26, the blank holder will have been pushed back into engagement with the adjustable abutment 25. As the gripping die 27 moves toward the fixed gripping die 26, the forming die 42 will bend the blank 40, as indicated by the dotted lines 41 (Fig. 15), and after the gripping jaws have gripped the blank between them, the forging die 33 will bend the free end of the blank 40 to shape the blank, as shown in Fig. 16. It should be noted that the pawls which transfer the blank vertically have now been shifted to position where, upon the opening of the gripping jaws after the first forging die 30 has performed its operation on the blank 40, pawls 224 and 260 will be beneath the shank of the blank holder 51.

The first time the gripping die 27 moves away from the gripping die 26 at the completion of the first forging operation, the slide 58 will move a short distance before it actuates the rack 186 due to the lost motion connection provided by the spaced lock nut assemblies 188 and 189. In this interval, while the slide 58 and actuator framework 57 are moving to the left (Fig. 5), the spring 166 (Figs. 5 and 13) will push the threaded rod 62 to the left, thereby driving the L-shaped member 160 to the left and through the L-shaped member 160, rotating the shaft 116 in a counter-clockwise direction (Fig. 13). As soon as the jaw 27 has released its grip on the blank 40, the spring 166 will rock the shaft 116 and through the spring cylinder 143 will rock the guide assemblies 118 and 120 counter-clockwise to disengage a blank 40 from the gripping jaw 26 by moving the blank toward the forging machine that is away from the front of the apparatus and by carrying the end or ends of the blank holder out of engagement with the adjustable abutment 125. Just before the lock nut assembly 189 engages the end of the lock 186 to move it to the left (Fig. 5), the lock rack 172 will disengage the latch member 173 and as soon as this occurs, the lock nut assembly 189 will engage the rack 186 to start the rotation of the gear segment 194. Also, in this short interval of lost motion between the slide 58 and rack 186, and just at the end of this lost motion, the cam slot 182 cut in block 183 will become effective through the action of pin 181 and lever 180 to rock the shaft 115 in a clockwise direction. Since the shaft 115 is interconnected with the guide assemblies 117 and 119 through the spring cylinder 142 and its associated parts, the guide assemblies 117 and 119 will be rocked to the position shown in Fig. 1. Thus, the guide rods 105 and 106 of the guide assemblies 117, 118, 119 and 120 will be in vertical alignment just before the clockwise rotation of gear segment 194 starts.

The different timing of the operation of the guide assemblies is provided so that the blank 40 in the first, second and fourth positions, where the blank holder 51 is reciprocated horizontally under control of the guide assemblies 118 and 120, may be moved toward the forging machine to disengage the turned-over end of the blank from the die on gripping die 26 before the framework 69 moves. The action of the guide assemblies 117 and 119 is somewhat later than the action of the guide assemblies 118 and 120 so that the blank will be moved transversely of its axis to disengage it from the fixed gripping die 26 before the blank is reciprocated horizontally.

By the operation of the mechanism just described, a blank in the blank holder 51 will be disengaged from the gripping dies and the dies formed thereon and moved toward the forging apparatus preparatory to shifting it vertically to the next forging step, where the blank will be stepped out of association with the first forging punch 30 and into association with the second forging punch 29. This shifting of the blank vertically is accomplished by the pawls on the pawl slide 209, which will be moved upwardly due to the engagement of the rack 208 with the gear segment 206. In transferring the blank holder 51 from the first position to the second position, the blank holder is not rotated about its axis, but is simply shifted straight upward due to the engagement of the underside of it by the pawls 224 and 336, which will lift the blank holder 51 upwardly to a position where it will rest on the notches 262 and 268 formed on the pawl slide guiding plates 217 and 218. The blank holder will be held in this position by the resilient action of the retaining plates 273 and 274.

As the second cycle of the forge starts and the gripping die 27 starts to move toward the fixed gripping die 26, the direction of movement of the slide 58 will be reversed and the slide will move toward the right (Figs. 5 and 7). As the slide 58 moves toward the right, the pawl slide 209 will move downwardly and the pawls which engage the blank holder 51 will be cammed about their pins and will pass under the blank holder. As the slide 58 continues to move toward the right, the abutment 59 moving with it will, toward the end of the travel of the slide 58 and gripping die 27, engage the threaded rod 62 to push it to the right. The first thing that occurs when the abutment 59 engages and starts to move the threaded rod 62, will be the shifting of the framework 69 due to the fact that the end of the lock rack 172 engages the front face of the latch 173 and prevents the L-shaped member 160 from imparting rotation to the shaft 116. However, as the slide 58 moves to the right, the pin 181 riding in the cam slot 182, will actuate lever 180 to impart counter-clockwise rotation to the shaft 115 and the blank holder 51, still carrying its disc 54 in alignment with the guide assembly 120, will not be affected at this time. However, the guide assemblies 117 and 119 will be pushed to the position shown in all of the figures, except Fig. 1. Furthermore, the blank which has been transferred from association with the lowermost forging punch 30, will now be in alignment with the forging punch 29 and will be, due to the movement of the framework 69 by the threaded rod 62 and cooperating parts, shifted into engagement with the fixed gripping die 26. At the end of the travel of the slide 58 to the right, the framework 69, having been shifted to a position where the lock rack 172 is beyond the right end (Fig. 13) of the latch 173, the L-shaped member 160 will move with respect to the frame 69 and the bearing block 114 carried thereby and thus the shaft 116 will be rotated to move the blank in the blank holder 51 back into nesting engagement with the fixed gripping die 26 in the area associated with the forging punch 29.

The operation of the apparatus on the succeeding steps of transferring the blank holder vertically through the apparatus will be exactly the same as just described in detail, but as the blank is transferred from the second to the third forging position, it must be turned 90 degrees so that the gripping jaws can remove part of the forging flash formed in the two previous forging operations. It should be noted, at this time, that in the first forging step, the blank was transformed from the shape shown in Fig. 15 to the shape shown in Fig. 16 and that in the second forging step, the head or nub 38 was formed on the blank by the forging die 29, thus raising the forging flash 43 which, in the succeeding steps, must be removed. Accordingly, the blank is transferred to the third step of the gripping dies, where the gripping dies squeeze the forging flash back into the stock of the blank. As the blank is transferred vertically by the pawls from its second to its third vertical position, the arm 56 will engage the segmental cam plate 315 and the blank holder 51 will thus be turned in a counterclockwise direction through 90 degrees to bring the arm 55 thereof into engagement with the bottom of the semi-circular cam plate 335. In this position, the blank holder will be nested in notches 263 and 269 on pawl slide guiding plates 217 and 218 and after the blank holder 51 has been turned through 90 degrees, in a counterclockwise direction, the blank holder will be shifted back by the guide assembly 119 into engagement with the adjustable abutment 127. When the gripping dies completely close, the blank being held in the third position thereof, part of the flash 43 will be removed from the blank.

The next cycle of the forge will be a duplicate of those previously described and the transfer mechanism will operate in a similar manner with the exception that the blank holder's disc 54 will move out of association with the guide assembly 119 and into association with the guide assembly 118 and the blank must be turned in a clockwise direction through 90 degrees so that a die 28, which is an exact duplicate of the die 29, may again strike the blank held in the gripping jaws 26 and 27 to complete the formation of the head 38. This turning of the blank through 90 degrees in a clockwise direction is accomplished by the semi-circular cam plate 335 which bears against the arm 55 of the holder and causes the blank holder to be rotated as it is transferred from the notches 263 and 269 to the notches 264 and 270 on the plates 217 and 218.

The next time the forge goes through its cycle of operation, the blank must again be rotated through 90 degrees in a counter-clockwise direction and this operation is accomplished by the semi-circular cam plate 314 engaging the arm 56 of the blank holder 51 during the transference of the blank vertically by the pawls on the pawl slide 209.

As the blank is transferred from the fourth to the fifth position of the gripping jaws, it is again rotated in a clockwise direction due to the engagement of the arm 55 of the blank holder 51 with the flat top of the cam plate 334 and in this station the forging of the blank is completed. However, in order to remove the blank from association with the gripping jaws and forging dies, another vertical step of movement is imparted to the blank in exactly the same manner described in detail hereinbefore and the blank will then rest at the top of the gripping jaws and as the gripping jaws close the sixth time, the blank will be struck by the movable gripping jaw 27 to remove a projection 339 which may be formed on it (Fig. 18) by the action of the gripping jaws in removing the molding flash 43.

The next time the jaws move apart to restore the apparatus to the position shown in Fig. 1, preparatory to receiving another blank 40 held by another blank holder 51, the pawl slide 209 will transfer the blank holder 51 upwardly the sixth time to carry the blank holder over the top slanting edges of the pawl slide guiding plates 217 and 218, where the blank holder with the finished drive hook will drop down the slanting edge onto the upper surface of the pawl slide, from which the article may be removed.

While the apparatus described hereinbefore relates to a specific article of manufacture, it will be understood that only slight modifications of the apparatus would be necessary to adapt it to handling other parts which may be formed by forging operations.

What is claimed is:

1. In a transfer mechanism for a multi-position forging machine, means for holding a blank to be forged and means for moving said holding means step by step from one forging position to another forging position comprising a toothed member fixed in a predetermined position, a second toothed member resiliently urged to a predetermined position to resiliently urge said holding means into engagement with the fixed toothed member, a shiftable plate reciprocable each time the forging machine operates, and a series of pawls on said reciprocable plate for transferring the holding means from one tooth to another on the fixed toothed member.

2. In combination with a forging machine including gripping dies and forming punches, a carriage mounted for limited reciprocation across the face of the forging machine, means interconnecting one of the gripping dies with said carriage to move the carriage when the die is moved, blank holding means, means for transferring said holding means from one position to another of the gripping dies after the carriage has come to rest, and means connected with one of said gripping dies for imparting movement to the carriage and for actuating the transferring means.

3. In combination with a forging machine including relatively movable gripping dies and forming punches, a carriage mounted for limited reciprocation across the face of the forging machine by one of the gripping dies, blank holding means for positioning a blank in the gripping dies, means for transferring said holding means from one position to another of the gripping dies after the carriage has come to rest, means connected with one of said gripping dies for imparting movement to the carriage during the latter part of movement of the gripping dies toward each other and during the first part of the movement of the gripping dies away from each other, and means associated with said carriage and actuated by the gripping dies for operating the transferring means to cause it to transfer an article during the latter part of the movement of the gripping dies away from each other.

4. In a transfer mechanism for multi-step forging machines, means connectible to a blank outside the body of the forging machine and insertable bodily into the forging machine for holding a blank to be forged, means for moving said holding means step by step from one forging position to another forging position, and abutments for engaging a part of the holding means during its movement for oscillating the blank as it is transferred from one forging position to another.

5. In a transfer mechanism for transferring parts to the various positions of a multi-position forging machine, a blank holder for holding the blank to be forged, a carriage for supporting said blank holder, means for imparting longitudinal reciprocation to the blank holder to disengage the blank from a forging die and engage it with a succeeding forging die, means for imparting reciprocation to the carriage to move the blank holder transversely of its axis, and a lost motion mechanism interconnecting the carriage and the means for imparting reciprocation to the carriage for delaying the operation of the carriage in its movement transversely of the axis of the blank holder until the longitudinal movement of the blank holder is completed.

6. In a transfer mechanism for transferring blanks to the various steps of a multi-step forging machine, a blank holder for supporting a blank to be forged, a series of guides for guiding the blank holder, means for transferring the blank holder in a predetermined direction through the guides, means for actuating said series of guides and transferring means, means for shifting the blank holder transversely to said predetermined direction, and means interconnecting the actuating means and the means actuated thereby to cause them to operate in a predetermined sequence.

7. In a transfer mechanism for multi-step forging machine, a blank holder for supporting a blank during its transference from one forging position to another; a series of abutments for positioning the blank holder longitudinally of its axis; guiding means for engaging a portion of the blank holder to force it resiliently against said abutments at each position of the blank holder; means for transferring the blank holder transversely of its axis in one direction; a carriage for supporting the abutments, the blank holder, the guiding means for the blank holder, and the means for transferring the blank holder transversely of its axis; and means for shifting said carriage in timed relation to the movements of the blank holder.

8. In a transfer mechanism for multiple-step forging machine having forging dies, a blank holder for holding a blank during its transfer from one position to another, a plurality of pawls for engaging said blank holder, a pawl slide for supporting said pawls, means for reciprocating said pawl slide to transfer the blank holder from one step to another of the forging machine, means for supporting the blank holder at each position of the forging machine, means for imparting oscillation to the blank holder as it is transferred by the pawls, and means for imparting reciprocation to the blank holder to register the blank thereon with a portion of the forging dies.

9. In a transfer mechanism for multi-step forges, a blank holder for holding a blank during its transfer from one position to another of the forge, a plurality of pawls for engaging said blank holder, a pawl slide for supporting said pawls, means for reciprocating said pawl slide to transfer the blank holder from one step to another of the forge, means for supporting the blank holder at each position of the forge, means for imparting oscillation to the blank holder as it is transferred by the pawls, and means for imparting longitudinal reciprocation to the blank holder to disengage it from portions of the forge and reengage with another portion of the forge.

10. In a transfer mechanism for multi-step forging machine, a blank holder for holding a blank during its transfer from one position to another, a plurality of pawls for engaging said blank holder, a pawl slide for supporting said pawls, means for reciprocating said pawl slide to transfer the blank holder from one step to another of the forging machine, means for supporting the blank holder at each position of the forging machine, means for imparting oscillation to the blank holder as it is transferred by the pawls, and means for imparting longitudinal reciprocation to the blank holder to register it with predetermined areas of the forging machine, and a carriage for supporting all of the aforementioned mechanisms.

11. In a transfer mechanism for multi-step forging machine, a blank holder for holding a blank during its transfer from one position to another, a plurality of pawls for engaging said blank holder, a pawl slide for supporting said pawls, means for reciprocating said pawl slide to transfer the blank holder from one step to another of the forging machine, means for supporting the blank holder at each position of the forging machine, means for imparting oscillation to the blank holder as it is transferred by the pawls, means for imparting longitudinal reciprocation to the blank holder to register it with predetermined areas of the forging machine, a carriage for supporting all of the aforementioned mechanisms, and means for imparting reciprocation to said carriage to disengage and reengage the blank held by the blank holder with various portions of the forging machine.

12. In a transfer mechanism for multi-step forging machine, a blank holder for holding a blank during its transfer from one position to another, a plurality of pawls for engaging said blank holder, a pawl slide for supporting said pawls, means for reciprocating said pawl slide to transfer the blank holder from one step to another of the forging machine, means for supporting the blank holder at each position of the forging machine, means for imparting oscillation to the blank holder as it is transferred by the pawls, means for imparting longitudinal reciprocation to the blank holder to register it with predetermined areas of the forging machine, a carriage for supporting all of the aforementioned mechanisms, and means for imparting reciprocation to said carriage to disengage and reengage the blank held by the blank holder with various portions of the forging machine, said means for reciprocating the carriage being operable in timed relation to the operation of the other mechanisms which actuate the blank holder.

13. In a transfer mechanism for multi-step forges, a blank holder for supporting a blank during the transference thereof between the various steps of the forge, means for positively moving the blank holder in a predetermined direction to disengage a blank from a portion of the forge, means for resiliently urging the blank holder in the opposite direction to reengage the blank held thereby with another portion of the forge, and means for engaging the blank holder at various positions of the forge to resist the movement of the blank holder in said opposite direction after the blank has registered with a portion of the forge.

14. In a transfer mechanism for multi-step forging machine, a blank holder for supporting a blank during its transference from one forging position to another; a series of abutments for positioning the blank holder longitudinally of its axis; guiding means for engaging a portion of the blank holder to force it resiliently against said abutments at each position of the blank holder; means for transferring the blank holder transversely of its axis in one direction; and a carriage for supporting the abutments, the blank holder, the guiding means for the blank holder, and the means for transferring the blank holder transversely of its axis.

15. The combination of a forging apparatus having stationary and movable members of a transfer mechanism for transferring a blank to predetermined forging positions comprising a chuck for holding a blank, a reciprocable member for receiving the chuck, a series of pawls cooperating with said reciprocable member to move the chuck to predetermined positions for holding the blank in the various forging positions, and means interconnecting the movable forging member and the reciprocable member to impart reciprocation to the reciprocable member for transferring the blank from one forging position to another.

16. In a transfer mechanism for multi-step forging machines, a chuck for receiving and holding a blank during the forging thereof, said chuck being insertable as a part of the transfer mechanism, means actuated by the forging machine for moving said chuck step by step to carry the blank from one forging position to another forging position, and means at each forging position for resiliently holding the chuck to determine the longitudinal position of the blank.

17. A transfer mechanism for a multi-step forging machine having gripping dies comprising a chuck for receiving and holding a blank, said chuck being insertable to act as a part of the transfer mechanism, chuck gripping devices adjacent each step of the forging machine, chuck engaging means for transferring the chuck from one chuck gripping device to another, and means actuated by one of the gripping dies of the forging machine for actuating said transfer means.

18. In combination with a forging machine having a plurality of forging positions, a transfer mechanism for transferring a blank from one forging position to another including a chuck for receiving and holding a blank during all of the forging operations thereon in the forging machine, chuck gripping jaws adjacent each forging position of the forging machine, and means actuated by the forging machine for transferring the chuck bodily from one chuck gripping jaw to another.

JAMES C. MORISON.